(12) United States Patent
Day et al.

(10) Patent No.: US 8,131,933 B2
(45) Date of Patent: Mar. 6, 2012

(54) METHODS AND SYSTEMS FOR COMMUNICATION BETWEEN STORAGE CONTROLLERS

(75) Inventors: Brian A. Day, Colorado Springs, CO (US); Timothy E. Hoglund, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 574 days.

(21) Appl. No.: 12/258,907

(22) Filed: Oct. 27, 2008

(65) Prior Publication Data

US 2010/0106911 A1   Apr. 29, 2010

(51) Int. Cl.
*G06F 12/00* (2006.01)

(52) U.S. Cl. ........................ 711/119; 711/162

(58) Field of Classification Search .................. 711/119, 711/162

See application file for complete search history.

(56) References Cited

U.S. PATENT DOCUMENTS

2006/0106982 A1* 5/2006 Ashmore et al. .............. 711/114
2006/0242312 A1* 10/2006 Crespi et al. .................. 709/230

(Continued)

*Primary Examiner* — Hashem Farrokh
(74) *Attorney, Agent, or Firm* — Duft Bornsen & Fishman LLP

(57) ABSTRACT

Methods and systems for communication between two storage controllers. A first storage controller specifies a special frame indicator in a frame of a protocol that is also used by a first storage controller to send a storage command to a storage device. The first storage controller transmits the frame to a second storage controller such that the frame comprises data in a payload field of the frame.

6 Claims, 6 Drawing Sheets

U.S. PATENT DOCUMENTS

2008/0091899 A1* 4/2008 Innan et al. .................. 711/162
2008/0162984 A1* 7/2008 Kalra et al. ...................... 714/4
2009/0248889 A1* 10/2009 Dickens et al. ............... 709/232
2009/0327481 A1* 12/2009 Rickard et al. ............... 709/224

* cited by examiner

METHODS AND SYSTEMS FOR COMMUNICATION BETWEEN STORAGE CONTROLLERS

BACKGROUND

1. Field of the Invention

The invention relates generally to storage systems and more specifically relates to communication between storage controllers.

2. Discussion of Related Art

Serial Attached SCSI ("SAS") comprises a family of standards for a computer system to couple with storage devices through storage controllers. Many details of the SAS family of standards may be found at www.t10.org. For example, a storage controller may communicate with a storage device (including a SAS disk drive) according to the Serial SCSI Protocol ("SSP") standard.

To improve reliability and availability of storage devices, at least two storage controllers may be used simultaneously to coordinate operations of the storage controllers and/or to provide redundancy. Providing redundancy comprises communication between storage controllers to ensure that information in each storage controller's input/output cache memory is relatively consistent. For example, a storage controller may be in an active mode such that a processor of the active storage controller continuously processes storage requests from the computer system. Meanwhile, another storage controller may be in a passive mode such that the passive storage controller does not process storage requests actively. Ensuring information in each storage controller's cache memory is relatively consistent allows the passive storage controller to become active and take over from the active storage controller if the active storage controller fails for some reason. Those skilled in the art will readily recognize that in another example, a storage controller may be actively processing storage requests, while also ensuring that the storage controller is ready to take over from another active storage controller.

In order to ensure that information in each storage controller's cache memory is relatively consistent, for example to maintain cache coherency, a mechanism is needed to communicate information between storage controllers. For example, a mechanism is needed for the active storage controller to transmit updated data in its cache memory to the passive storage controller in order for the updated data to be written to the cache memory of the passive storage controller. Similarly, a mechanism is needed to communicate information between storage controllers to coordinate operations of the storage controllers. One mechanism is to provide a dedicated link for communication between the two storage controllers. However, this mechanism requires costly overhead including additional hardware, firmware, and/or software.

Thus it is an ongoing challenge to maintain cache coherency and provide communication between two storage controllers.

SUMMARY

The present invention solves the above and other problems, thereby advancing the state of the useful arts, by providing methods and systems for communication between two storage controllers. A first storage controller specifies a special frame indicator in a frame of a protocol that is also used by a first storage controller to send a storage command to a storage device. The first storage controller transmits the frame to a second storage controller such that the frame comprises data in a payload field of the frame. Accordingly, costly overhead is drastically reduced by using the same media and protocol used for exchanging with the storage devices, and the two storage controllers can readily communicate with each other.

In one aspect hereof, a method is provided for communication between a first storage controller and a second storage controller. The method comprises specifying a special frame indicator in a frame of a protocol. The protocol is also used by the first storage controller to send a storage command to a storage device. The method also comprises transmitting the frame from the first storage controller to the second storage controller. The frame comprises data in a payload field of the frame.

Another aspect hereof provides a storage system for supporting communication between a first storage controller and a second storage controller. The storage system comprises the first storage controller, the second storage controller, and a storage device. The first storage controller comprises a specifying element for specifying a special frame indicator in a frame of a protocol. The protocol is also used by the first storage controller to send a storage command to the storage device. The first storage controller also comprises a transmitting element for transmitting the frame from the first storage controller to the second storage controller. The frame comprises data in a payload field of the frame.

DETAILED DESCRIPTION OF THE DRAWINGS

Figure 1:
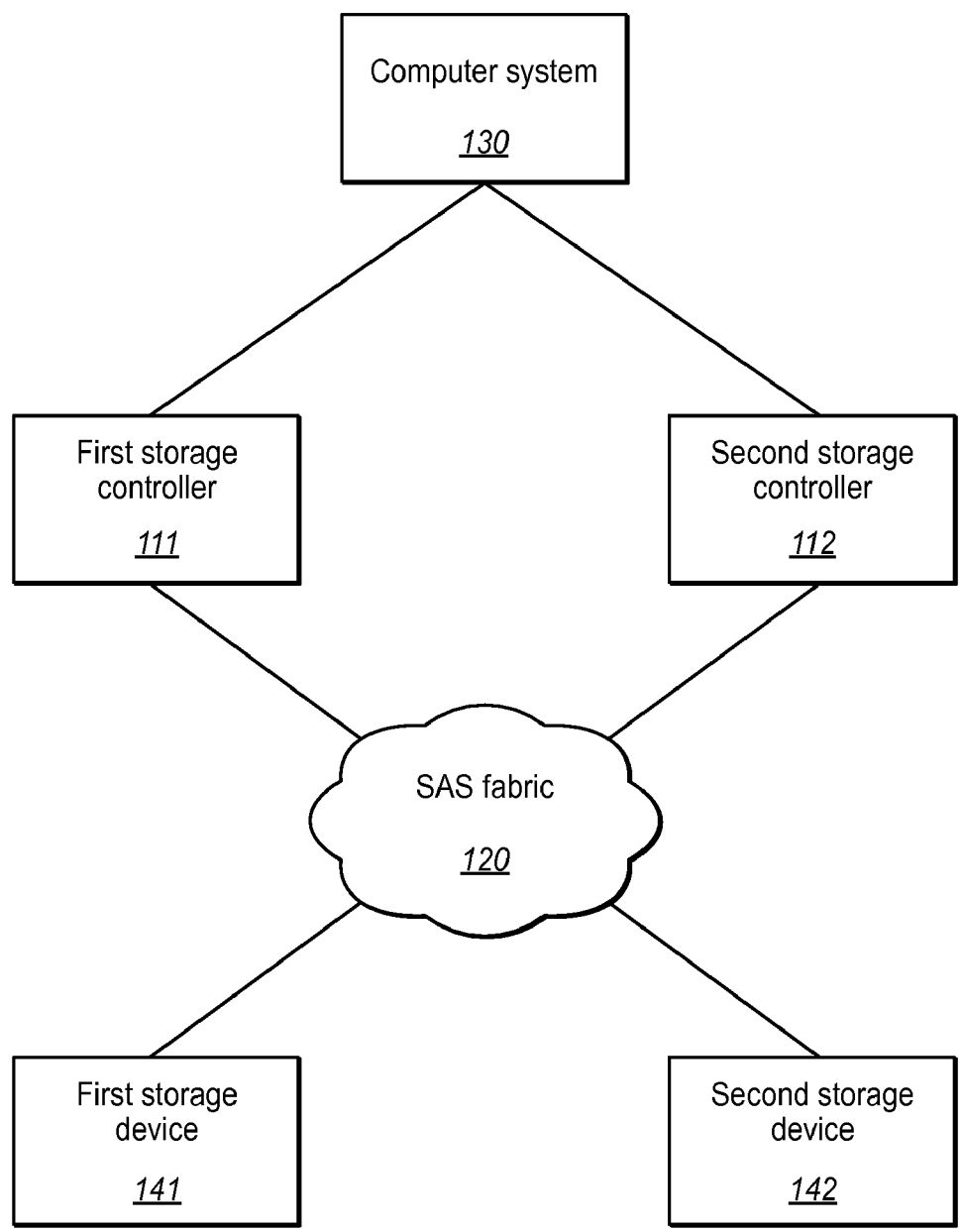
FIG. 1 is a block diagram of an exemplary system for communication between two storage controllers in accordance with features and aspects hereof.

FIG. 1 is a block diagram of an exemplary system for communication between two storage controllers in accordance with features and aspects hereof. The system comprises a first storage controller 111 and a second storage controller 112. Both controllers are in communication with a computer system 130, allowing the computer system 130 to couple with at least one storage device. The first storage controller 111 can be in communication with a first storage device 141 and a second storage device 142 through a SAS fabric 120. Similarly, the second storage controller 112 can also be in communication with the first storage device 141 and the second storage device 142 through the SAS fabric 120. It will be understood that the two storage controllers may be in active-passive mode with the passive storage controller being ready to take over from the active storage controller, or in active-active mode with each storage controllers being ready to take over from the other storage controller. Additionally, the first storage controller 111 is in communication with the second storage controller 112 through the SAS fabric 120.

The first storage controller 111 and the second storage controller 112 may each be a Redundant Array of Independent Disk ("RAID") controller that manages storage devices (including SAS disk drives) and provides the computer system 130 access to the storage devices. The first storage device 141 and the second storage device 142 may each be a storage device selected from a Serial Attached SCSI ("SAS") disk drive and a Serial Advanced Technology Attachment ("SATA") disk drive. The SAS fabric 120 may comprise SAS expanders and/or switches in a wide variety of configurations. One protocol used in the SAS fabric 120 may be the SSP standard. SSP defines a standard for communication between the first storage controller 111 and the storage devices. It will be appreciated by those skilled in the art that the first storage controller 111 is in communication with the second storage controller 112 through the same SAS fabric 120 and the SSP standard in accordance with features and aspects hereof.

Figure 2:
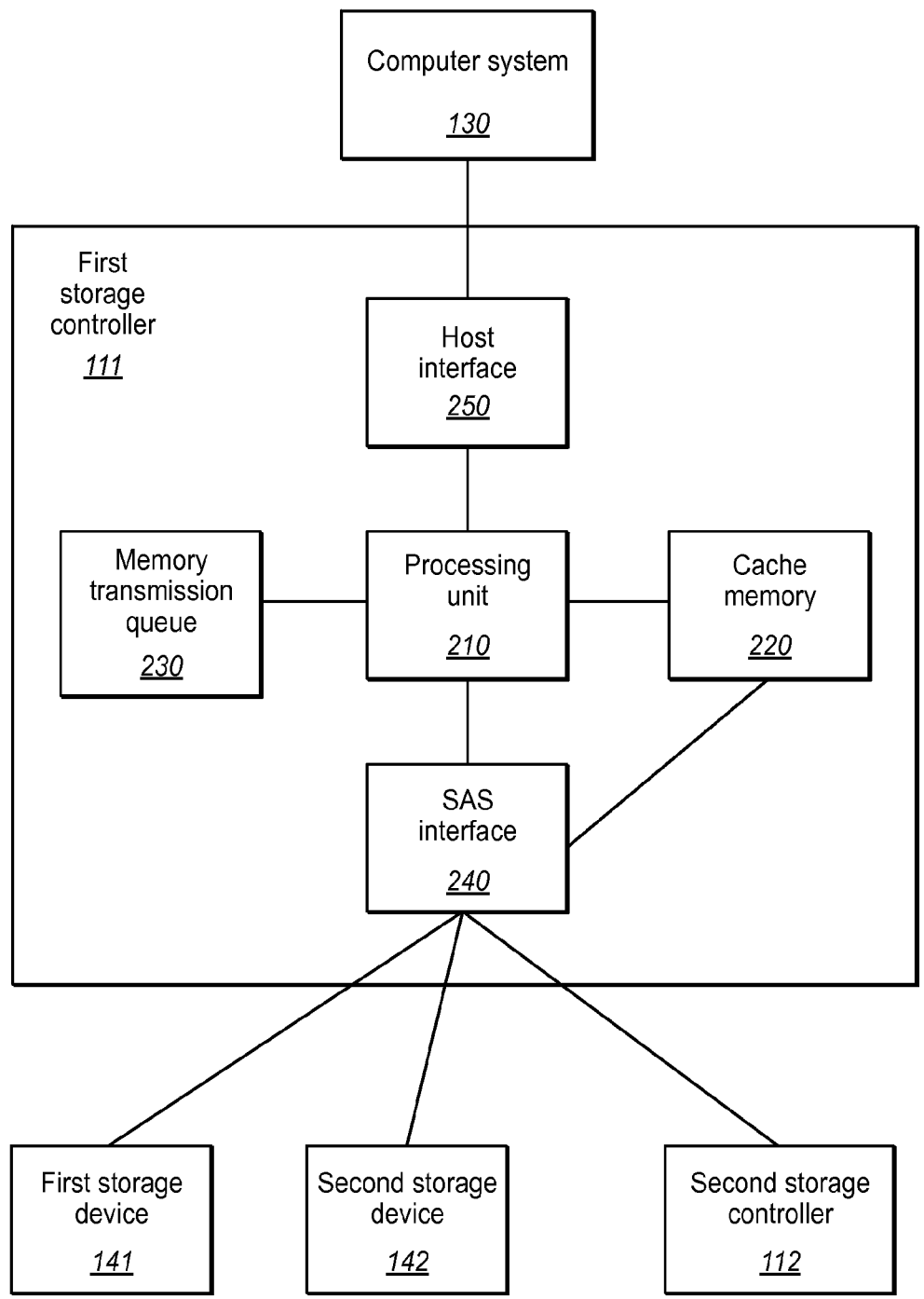
FIG. 2 is a block diagram of an exemplary first storage controller for communication with a second storage controller in accordance with features and aspects hereof.

FIG. 2 is a block diagram of an exemplary first storage controller 111 for communication with a second storage controller 112 in accordance with features and aspects hereof. The first storage controller 111 is in communication with the first storage device 141, the second storage controller 142, and the second storage controller 112 through a SAS interface 240 and an appropriate SAS fabric (if any). The first storage controller 111 is also in communication with the computer system 130 through a host interface 250. The host interface 250 may comprise any of a number of host interfaces including Peripheral Component Interconnect ("PCI") and PCI Express. Besides the SAS interface 240 and the host interface 250, the first storage controller 111 also comprises a memory transmission queue 230, a processing unit 210, and cache memory 220. The cache memory 220 may also comprise memory of the computer system accessed through the host interface 250.

The memory transmission queue 230 comprises one or more memory transmission entries. Each memory transmission entry comprises information that will result in a transmission of one or more frames. Each of these frames may be transmitted to a storage device or another storage controller; both types of transmission are supported by the same memory transmission queue 230. Additionally, each frame will comprise data from the cache memory 220 of the first storage controller 111. For example, each memory transmission entry may specify a pointer to data (e.g., a pointer may point to data directly or point to one or more pointers that each points to data) or specific the data itself (e.g., any pointer may be null). In the former case, the memory transmission entry may result in the transmission of a series of data frames, while the latter case may result in the transmission of a configuration frame. The data frames may comprise information communicated for mirroring cache memory, while the configuration frame may comprise information communicated to coordinate operations of the first storage controller and the second storage controller. One skill in the art will recognize that one way to specify data is with a scatter-gather list. A pointer may point to the scatter-gather list, which comprises one or more scatter-gather entries each specifying a source (comprising source memory address and data length) of the data to be transmitted.

Accordingly, each memory transmission entry may also comprise a field that specifies how the data should be referenced (e.g., no pointer dereference, or one or two levels of pointer dereference). Additionally, a memory transmission entry may also specify in a confirmation requested bit whether the first storage controller 111 requests a confirmation from a recipient (e.g., the second storage controller 112) of the data (or a certain portion of the data) specified by the memory transmission entry. If so, the request would be specified in the last transmitted frame that results from the memory transmission entry (or a scatter-gather entry).

Each memory transmission entry may further specify whether the resultant data transmission is of non-posted type (i.e., the first storage controller 111 expects a confirmation), posted type, or data confirmation type. It is noted that the confirmation requested bit noted above is independent of the type of transmission. For example, if the confirmation requested bit is asserted, even if the recipient (e.g., the second storage controller 112) receives a frame with posted type specified, the recipient is expected to confirm the receipt of the frame by sending back a frame of the data confirmation type.

The processing unit 210 may comprise circuitry, memory, processor, and/or instructions to handle processing needs of the first storage controller 111. For example, the processing unit 210 is in communication with the host interface 250 and the SAS interface 240 to allow the first storage controller 111 to communicate with the computer system 130, the first storage device 141, the second storage device 142, and the second storage controller 112. The processing unit 210 may add an entry to the memory transmission queue 230 for the entry to be processed, and may also retrieve an entry from the memory transmission queue 230 for processing. The processing unit 210 also has access to the cache memory 220, for example, for maintaining a processing state of the first storage controller 111 as represented by cached data stored in response to processing host requests. Additionally, a direct memory access may be set up between the SAS interface 240 and the cache memory 220 so that data received through the SAS interface 240 may be stored in the cache memory 220 directly. It will be appreciated by those skilled in the art that although the various elements of the first storage controller 111 are typically used for communication with storage devices, communication with the second storage controller 112 may be based on the same elements in accordance with features and aspects hereof. It will also be understood that the second storage controller 112 comprises elements similar to those discussed above with respect to the first storage controller 111.

Figure 3:
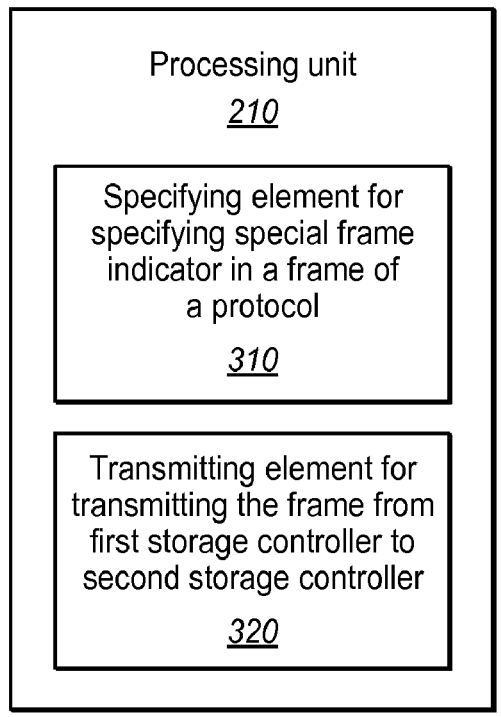
FIG. 3 is a block diagram of an exemplary processing element of a storage controller in accordance with features and aspects hereof.

FIG. 3 is a block diagram of an exemplary processing element of a storage controller in accordance with features and aspects hereof. The processing unit 210 comprises a specifying element 310 for specifying a special frame indicator in a frame of a protocol. The protocol is also used by a first storage controller to send a storage command to a storage device. The processing unit 210 also comprises a transmitting element 320 for transmitting the frame from the first storage controller to a second storage controller. The frame comprises data in a payload field of the frame.

Those of ordinary skill in the art will readily recognize numerous additional and equivalent components and modules within a fully functional apparatus. Such additional and equivalent components are omitted herein for simplicity and brevity of this discussion. Thus, the structures of FIGS. 1 through 3 are intended merely as representatives of exemplary embodiments of features and aspects hereof.

Figure 4:
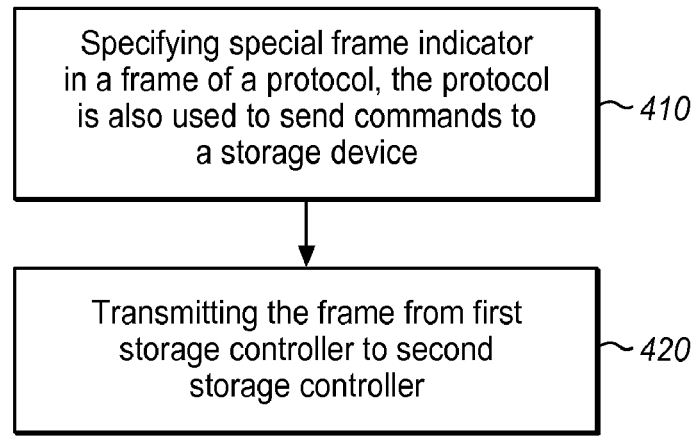
FIG. 4 is a flowchart describing an exemplary method in accordance with features and aspects hereof to provide communication between two storage controllers.

FIG. 4 is a flowchart describing an exemplary method in accordance with features and aspects hereof to provide communication between two storage controllers. At step 410, a first storage controller specifies a special frame indicator in a frame of a protocol. The protocol is also used by a first storage controller to send a storage command to a storage device. At step 420, the first storage controller transmits the frame to a second storage controller. The frame comprises data in a payload field of the frame.

Figure 5:
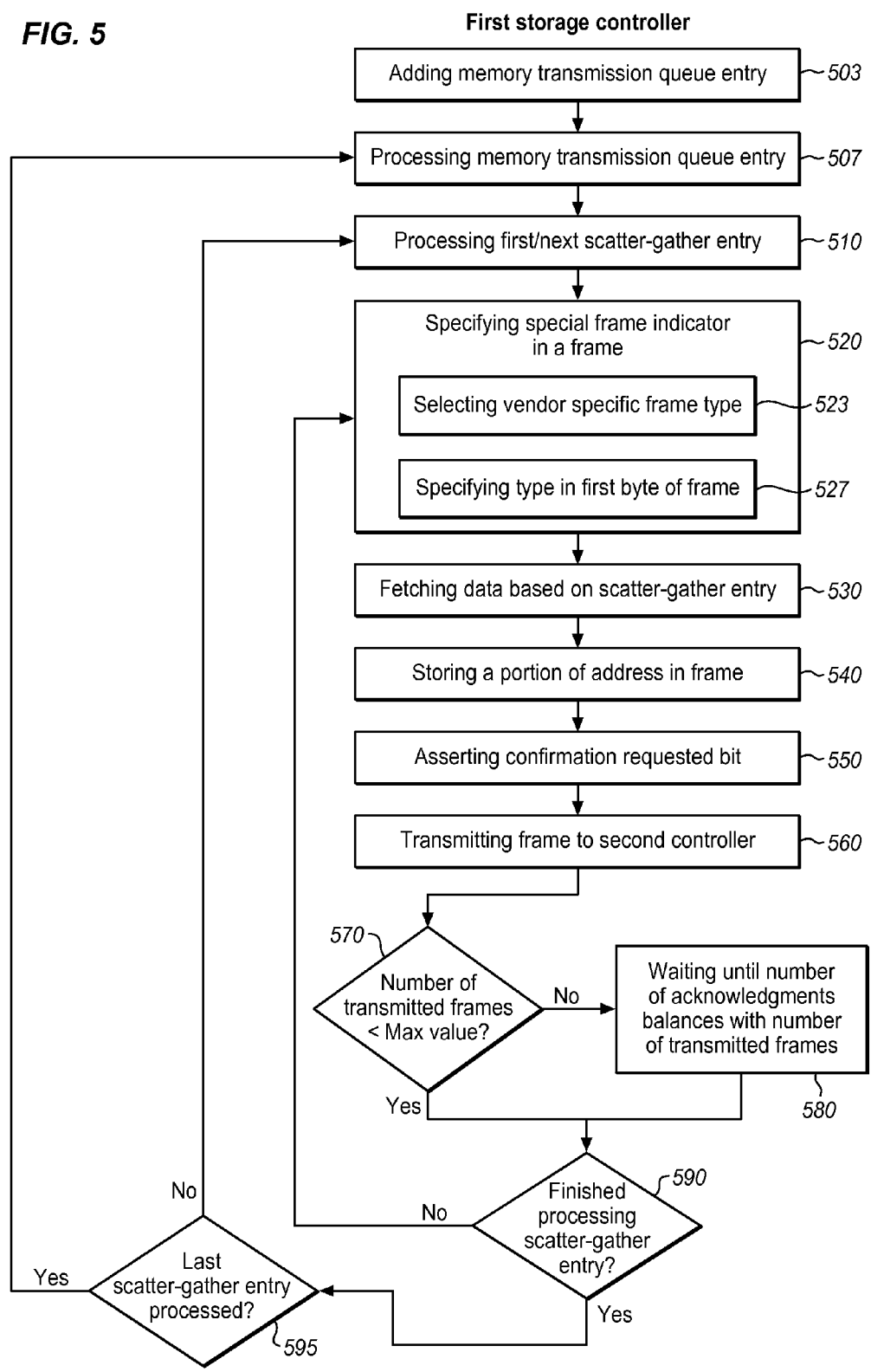
FIG. 5 is a flowchart describing an exemplary method at a first storage controller in accordance with features and aspects hereof to provide communication between two storage controllers.

FIG. 5 is a flowchart describing an exemplary method at a first storage controller in accordance with features and aspects hereof to provide communication between two storage controllers. At step 503, the first storage controller adds a memory transmission entry to a memory transmission queue. The memory transmission entry specifies data to be transmitted to a second storage controller for mirroring cache memory and/or to coordinate operations of the storage controllers. It is noted that the memory transmission queue is also used by the first storage controller to send commands and data to a storage device. At step 507, the first storage controller selects the memory transmission entry from the memory transmission queue for processing in order to create one or more frames and transmit the frames to the second storage controller.

As noted above, each memory transmission entry may specify a pointer to data. In this exemplary method, the memory transmission entry from the memory transmission queue comprises a pointer to a scatter-gather list. The scatter-gather list comprises at least one scatter-gather entry. Each scatter-gather entry may result in the creation and transmission of one or more frames. At step 510, the first storage controller selects a first scatter-gather entry from the scatter-gather list for processing in order to create the frames. At step 520, the first storage controller specifies a special frame indicator in a frame that has been created. The frame may be an SSP frame if the protocol used is SSP, and the special frame indicator may comprise a vendor specific frame type. Accordingly, step 520 may comprise selecting the vendor specific frame type from a value in a range from F0h to FFh at step 523, and specifying the vendor specific frame type in a first byte of the frame at step 527. Alternatively, the special frame indicator may comprise one or more other vendor-unique bits in the frame header.

At step 530, the first storage controller fetches data based on the scatter-gather entry. The scatter-gather entry comprises a memory address in the first storage controller's cache memory from which the data should be fetched, and the scatter-gather entry also comprises a data length that specifies how much data to fetch. It will be understood that a single frame may not provide sufficient payload to carry all of the data specified by one scatter-gather entry. Accordingly, not all data specified by the scatter-gather entry may be fetched and copied into a single frame, and multiple frames may be created for a scatter-gather entry as noted above. Conversely, it will be understood that multiple scatter-gather entries may be combined and all data specified by the multiple scatter-gather entries may be fetched and copied into a single frame. For example, data in a payload field of the frame may be structured to comprise one or more memory addresses rather than merely data.

At step 540, the first storage controller stores a portion of the memory address in the frame. It will be understood that to maintain cache coherency, data generally needs to be mirrored at a same offset within the cache memory of the second storage controller (i.e., the passive storage controller for this operation) as the first storage controller (i.e., the active storage controller). Additionally, a full memory address may comprise both an offset and a base address, and each storage controller may be associated with its own base address. Accordingly, if the data is communicated for mirroring cache memory from the first storage controller to the second storage controller, it may not be necessary to transmit the full memory address. Rather, only a portion of the memory address may be transmitted to the second storage controller to allow the second storage controller to generate the offset. For example, the first storage controller may save a lower 32-bit portion of the memory address in a first field of the frame (e.g., the data offset field of an SSP frame), and an upper portion of the memory address above the lower 32-bit portion in a second field of the frame (e.g., within the target port transfer tag field of the SSP frame). The upper portion may comprise 8 bits that may be stored in the low 8 bits of the target port transfer tag field of an SSP frame.

At step 550, the first storage controller asserts a confirmation requested bit if the frame is the last frame to be transmitted for the scatter-gather entry (the scatter-gather entry might also be the last scatter-gather entry specified by the memory transmission entry). As will be explained in greater detail, the second storage controller is expected to transmit a data confirmation frame back to the first storage controller if the confirmation requested bit is asserted. At step 560, the first storage controller transmits to the second storage controller the frame that has been created.

At step 570, the first storage controller checks a number of transmitted frames against a max frames value. The max frames value may have been configured by a user or at the factory. If the number of transmitted frames is less than the max frames value, the first storage controller proceeds to step 590. Otherwise, the first storage controller waits at step 580 until a number of acknowledgements (from the second storage controller) balances with the number of transmitted frames in an internal state machine of the first storage controller. Advantageously, checkpoints are thus created to periodically check that transmissions have been successful for every "max frames value" number of transmitted frames. If an error occurs, the storage controllers can restart transmission from a known successful checkpoint, instead of restarting the entire operation.

At step 590, the first storage controller checks whether processing of the scatter-gather entry is complete. If not, the first storage controller returns to step 523 and creates another frame in order to transmit additional data to the second storage controller. Otherwise, the first storage controller proceeds to step 595 to determine if the last scatter-gather entry has been processed. If not, the first storage controller returns to step 510 to process the next scatter-gather entry. Otherwise, the first storage controller returns to step 503 to add another memory transmission queue entry and/or to step 507 to process another memory transmission queue entry. As noted above, a memory transmission entry may comprise data that can be transmitted in a single frame. It will be understood that in this case, steps including 510, 530, and 590 relating to a scatter-gather entry may be skipped.

Figure 6:
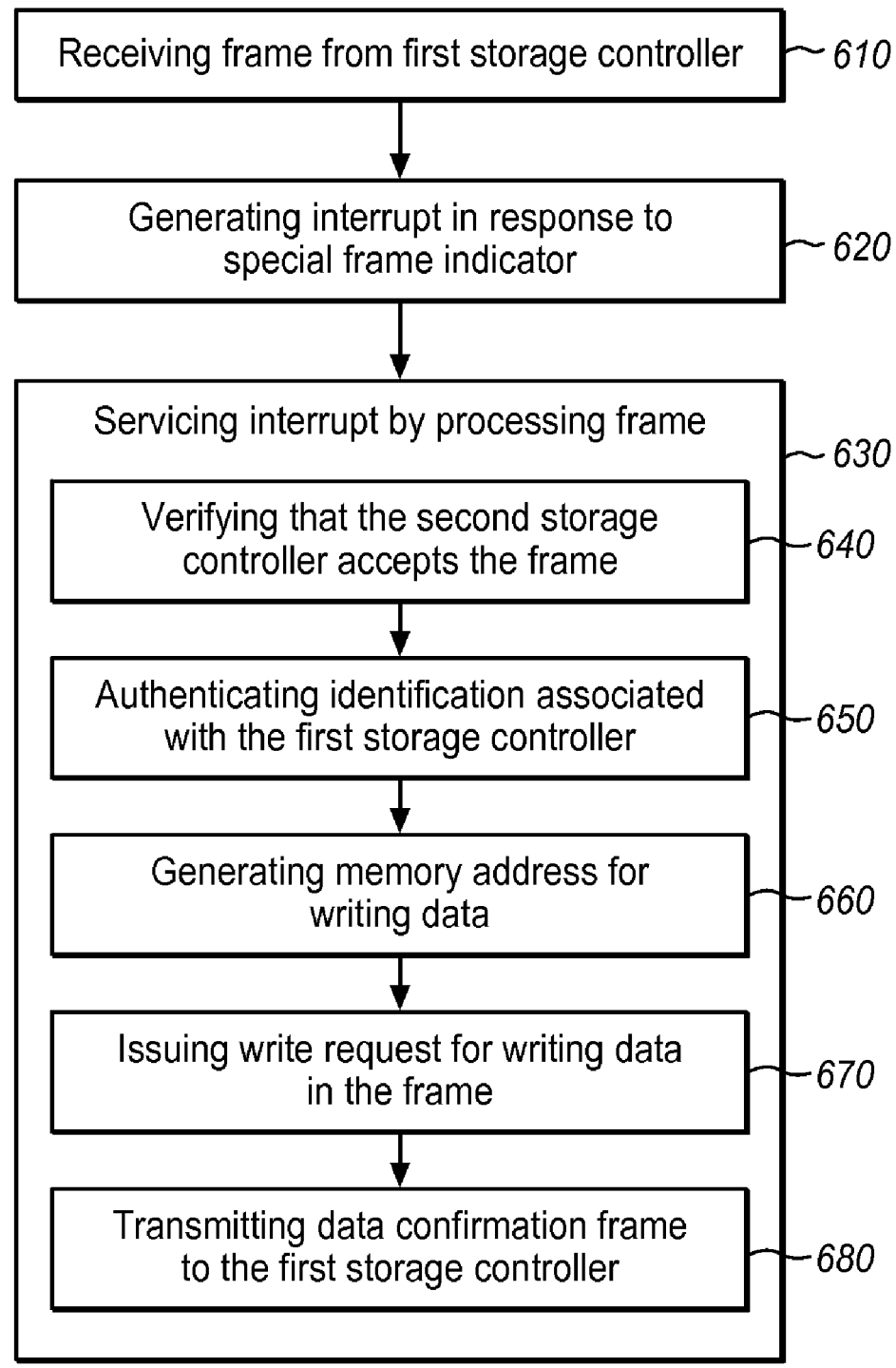
FIG. 6 is a flowchart describing an exemplary method at a second storage controller in accordance with features and aspects hereof.

FIG. 6 is a flowchart describing an exemplary method at a second storage controller in accordance with features and aspects hereof. At step 610, the second storage controller receives the frame from the first storage controller. The frame includes a special frame indicator. In response to the special frame indicator, the second storage controller generates an interrupt at step 620 as one exemplary design choice. The second storage controller then services the interrupt by processing the frame at step 630. More generally, a parameter of the frame will cause special processing to be initiated by a recipient storage controller rather than standard processing by a storage device.

Processing the frame at step 630 comprises one or more of the following steps. At step 640, the second storage controller verifies that the second storage controller accepts the frame. At step 650, the second storage controller checks an identification associated with the first storage controller against an authenticated identification. Both the authenticated identification and whether the second storage controller accepts the frame may be configured by a user.

At step 660, the second storage controller generates a memory address for writing the data that has been fetched by the first storage controller and transmitted in the frame. Details of generating the memory address will be explained in greater detail. At step 670, the second storage controller issues a write request for writing the data to the second storage controller's cache memory (at the generated memory address in a mirrored portion of the second storage controller's cache memory). If the confirmation requested bit in the frame is asserted, the write request would be a non-posted type so that the second storage controller would receive a confirmation after the write requested has been completed. If the frame is one in which non-posted type is specified, or in which the confirmation requested bit in the frame is asserted, the second storage controller would transmit a data confirmation frame back to the first storage controller at step 680. It will be understood by those skilled in the art that the second storage controller may add a memory transmission entry to its memory transmission queue, and process the memory transmission entry by transmitting to the first storage controller a frame of the data confirmation type.

It will also be appreciated by those skilled in the art that in some instances, the second storage controller may combine frames so that data from multiple frames may be combined into one write request (to the mirrored portion of its cache memory). The data may have originated based on a single scatter-gather entry at the first storage controller. A field in a frame may be used to indicate that the frame is one of several frames that may be combined and/or indicate that one or more additional frames created from the single scatter-gather entry will be received by the second storage controller.

Figure 7:
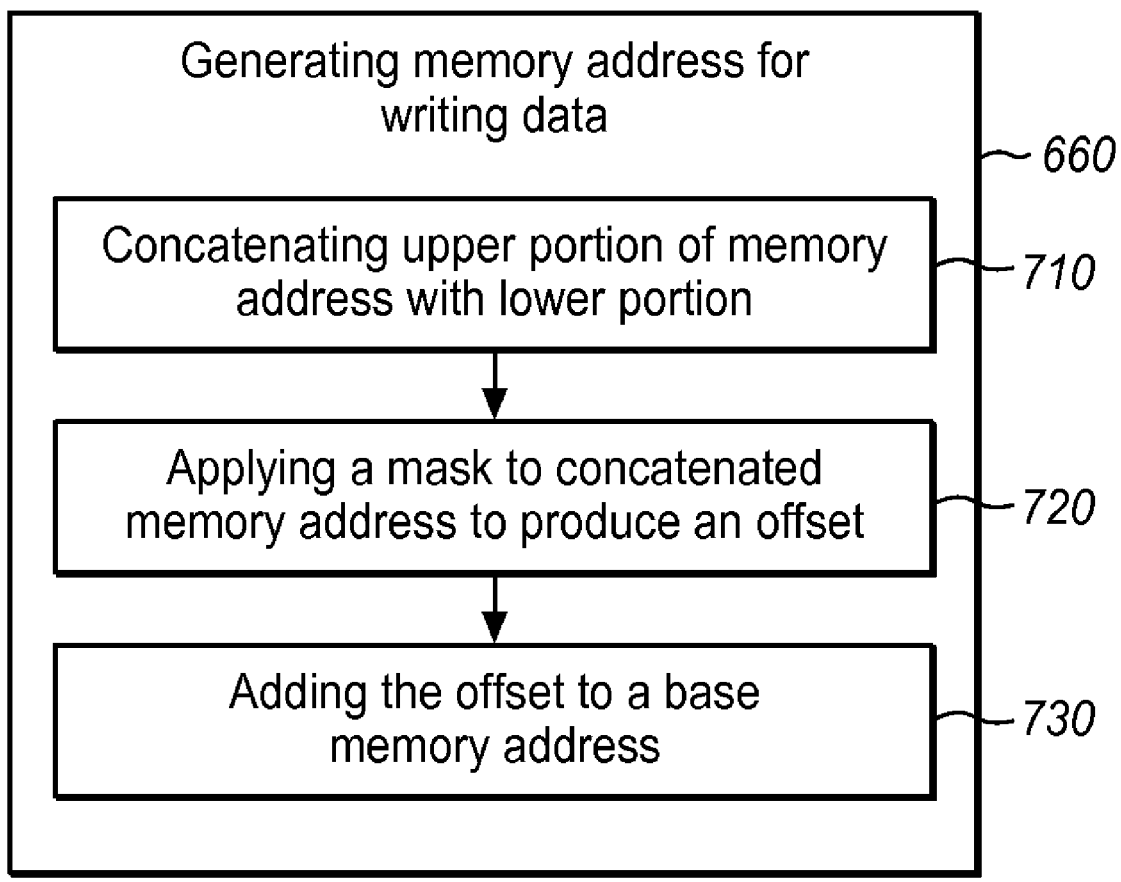
FIG. 7 is a flowchart describing exemplary additional details for generating a memory address for writing data in accordance with features and aspects hereof.

FIG. 7 is a flowchart describing exemplary additional details for generating a memory address for writing data (in the second storage controller's mirrored portion of its cache memory) in accordance with features and aspects hereof. The step 660 of generating a memory address for writing data comprises the following. At step 710, the second storage controller concatenates an upper portion of a memory address from a first field of the frame (e.g., the low 8 bits of the target port transfer tag field of a received SSP frame) with a lower 32-bit portion of the memory address from a second field of the frame (e.g., the data offset field of the SSP frame) to produce a concatenated address. At step 720, the second storage controller applies a mask to the concatenated address to produce an offset. At step 730, the second storage controller adds the offset to a base memory address to generate a memory address in a mirrored portion of the second storage controller's cache memory.

Those of ordinary skill in the art will readily recognize numerous additional and equivalent steps that may be performed and/or omitted in the methods of FIGS. 4 through 7. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for communication between a first storage controller and a second storage controller wherein the first and second storage controllers are communicatively coupled through a communication medium and protocol, the method comprising:
   specifying a special frame indicator in a frame of the protocol, wherein the communication medium and protocol is also used by the first storage controller to send a storage command to a storage device;
   transmitting the frame from the first storage controller to the second storage controller, wherein the frame comprises data in a payload field of the frame;
   checking, at the first storage controller, a number of transmitted frames against a max frames value; and
   waiting, when the number of transmitted frames reaches the max frames values, until a number of acknowledgments balances with the number of transmitted frames in a state machine.

2. A method for communication between a first storage controller and a second storage controller wherein the first and second storage controllers are communicatively coupled through a communication medium and protocol, the method comprising:
   specifying a special frame indicator in a frame of the protocol, wherein the communication medium and protocol is also used by the first storage controller to send a storage command to a storage device;
   transmitting the frame from the first storage controller to the second storage controller, wherein the frame comprises data in a payload field of the frame;
   verifying, at the second storage controller, that the second storage controller accepts the frame; and
   checking, at the second storage controller, an identification associated with the first storage controller against an authenticated identification.

3. A method for communication between a first storage controller and a second storage controller wherein the first and second storage controllers are communicatively coupled through a communication medium and protocol, the method comprising:
   specifying a special frame indicator in a frame of the protocol, wherein the communication medium and protocol is also used by the first storage controller to send a storage command to a storage device;
   transmitting the frame from the first storage controller to the second storage controller, wherein the frame comprises data in a payload field of the frame;
   generating, at the second storage controller, a memory address to write the data, further comprising:
      concatenating an upper portion of a memory address from a first field of the frame with a lower 32-bit portion of the memory address from a second field of the frame to produce a concatenated address;
      applying a mask to the concatenated address to produce an offset; and
      adding the offset to a base memory address.

4. A storage system for supporting communication between a first storage controller and a second storage controller, the storage system comprising:
   the first storage controller;
   the second storage controller;
   a storage device; and a communication medium coupling the first storage controller with the second storage controller and coupling the first storage controller with the storage device wherein the communication medium is used in accordance with a protocol, wherein the first storage controller comprises:
   a specifying element for specifying a special frame indicator in a frame of the protocol, wherein the protocol is also used by the first storage controller to send a storage command to the storage device; and a transmitting element for transmitting the frame from the first storage controller to the second storage controller, wherein the frame comprises data in a payload field of the frame, wherein the first storage controller further comprises:

a checking element for checking a number of transmitted frames against a max frames value;

a waiting element for waiting, when the number of transmitted frames reaches the max frames values, until a number of acknowledgments balances with the number of transmitted frames in a state machine.

5. A storage system for supporting communication between a first storage controller and a second storage controller, the storage system comprising:

the first storage controller;
   the second storage controller;
   a storage device; and
   a communication medium coupling the first storage controller with the second storage controller and coupling the first storage controller with the storage device wherein the communication medium is used in accordance with a protocol, wherein the first storage controller comprises:
   a specifying element for specifying a special frame indicator in a frame of the protocol, wherein the protocol is also used by the first storage controller to send a storage command to the storage device; and a transmitting element for transmitting the frame from the first storage controller to the second storage controller, wherein the frame comprises data in a payload field of the frame, wherein the second storage controller comprises:
   a verifying element for verifying that the second storage controller accepts the frame; and
   a checking element for checking an identification associated with the first storage controller against an authenticated identification.

6. A storage system for supporting communication between a first storage controller and a second storage controller, the storage system comprising:

the first storage controller;
   the second storage controller;
   a storage device; and
   a communication medium coupling the first storage controller with the second storage controller and coupling the first storage controller with the storage device wherein the communication medium is used in accordance with a protocol, wherein the first storage controller comprises:
   a specifying element for specifying a special frame indicator in a frame of the protocol, wherein the protocol is also used by the first storage controller to send a storage command to the storage device; and a transmitting element for transmitting the frame from the first storage controller to the second storage controller, wherein the frame comprises data in a payload field of the frame, wherein the second storage controller comprises:

a generating element for generating a memory address to write the data, further comprising:
   a concatenating element for concatenating an upper portion of a memory address from a first field of the frame with a lower 32-bit portion of the memory address from a second field of the frame to produce a concatenated address;
   an applying element for applying a mask to the concatenated address to produce an offset; and
   an adding element for adding the offset to a base memory address.

\* \* \* \* \*